US010723068B2

(12) United States Patent
Vadder

(10) Patent No.: US 10,723,068 B2
(45) Date of Patent: Jul. 28, 2020

(54) ADDITIVE MANUFACTURING BY SELECTIVE LIQUID COOLING

(71) Applicant: Evapco, Inc., Taneytown, MD (US)

(72) Inventor: Davey Vadder, Westminster, MD (US)

(73) Assignee: Evapco, Inc., Taneytown, MD (US)

(*) Notice: Subject to any disclaimer, the term of this patent is extended or adjusted under 35 U.S.C. 154(b) by 0 days.

(21) Appl. No.: 16/110,328

(22) Filed: Aug. 23, 2018

(65) Prior Publication Data

US 2019/0134887 A1    May 9, 2019

Related U.S. Application Data

(60) Provisional application No. 62/549,167, filed on Aug. 23, 2017.

(51) Int. Cl.

| *B29C 64/124* | (2017.01) |
| *B29C 64/295* | (2017.01) |
| *B33Y 30/00* | (2015.01) |
| *B29C 64/245* | (2017.01) |
| *B29K 105/00* | (2006.01) |
| *B29K 101/12* | (2006.01) |
| *B33Y 10/00* | (2015.01) |
| *G06K 15/10* | (2006.01) |

(52) U.S. Cl.
CPC ......... *B29C 64/124* (2017.08); *B29C 64/245* (2017.08); *B29C 64/295* (2017.08); *B29K 2101/12* (2013.01); *B29K 2105/0058* (2013.01); *B33Y 10/00* (2014.12); *B33Y 30/00* (2014.12); *G06K 15/10* (2013.01)

(58) Field of Classification Search
None
See application file for complete search history.

(56) References Cited

U.S. PATENT DOCUMENTS

| 5,236,637 A | 8/1993 | Hull | |
| 10,232,605 B2* | 3/2019 | DeSimone | B33Y 10/00 |
| 2007/0074659 A1* | 4/2007 | Wahlstrom | B33Y 40/00 |
| | | | 118/679 |
| 2011/0089610 A1 | 4/2011 | El-Siblani et al. | |
| 2012/0046779 A1* | 2/2012 | Pax | B29C 64/106 |
| | | | 700/112 |
| 2012/0189729 A1* | 7/2012 | Pax | B29C 48/05 |
| | | | 425/378.1 |
| 2013/0009338 A1* | 1/2013 | Mayer | B29C 64/106 |
| | | | 264/241 |
| 2013/0098068 A1* | 4/2013 | Takahashi | F25B 21/02 |
| | | | 62/3.2 |
| 2014/0085620 A1 | 3/2014 | Lobovsky et al. | |
| 2015/0224710 A1* | 8/2015 | El-Siblani | B33Y 70/00 |
| | | | 264/401 |
| 2016/0096326 A1 | 4/2016 | Naware | |
| 2016/0176118 A1 | 6/2016 | Reese et al. | |

(Continued)

OTHER PUBLICATIONS

International Search Report issued in co-pending International Application No. PCT/US18/47725 dated Nov. 26, 2018.

*Primary Examiner* — Jacob T Minskey
*Assistant Examiner* — Baileigh Kate Darnell
(74) *Attorney, Agent, or Firm* — Whiteford, Taylor & Preston, LLP; Peter J. Davis

(57) ABSTRACT

A method of additively manufacturing parts by selectively cooling a liquefied thermoplastic material.

6 Claims, 11 Drawing Sheets

Cross-Sectional View

(56) References Cited

U.S. PATENT DOCUMENTS

2016/0185045 A1* 6/2016 Linnell .................. B33Y 50/02
                                                      264/401
2017/0057177 A1* 3/2017 Ferguson ............... B33Y 30/00
2017/0173880 A1   6/2017 Desimone et al.
2017/0355137 A1* 12/2017 Ederer .................. B29C 64/165

* cited by examiner

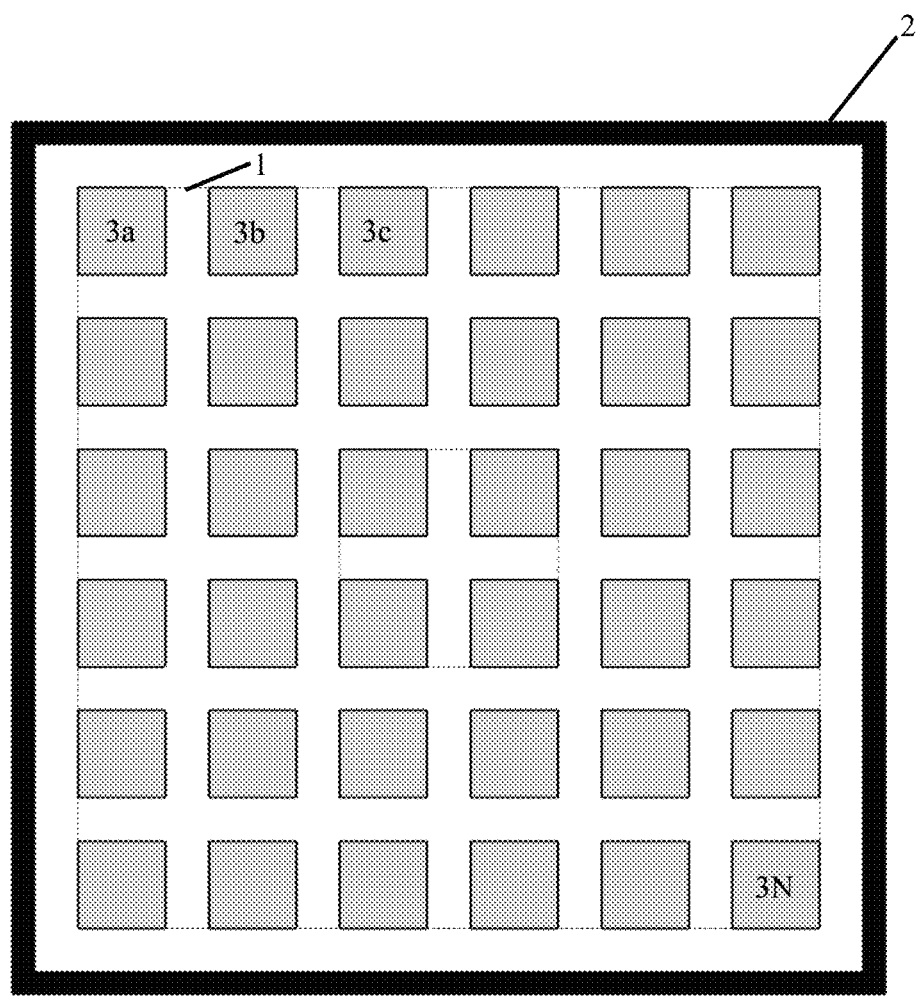
Figure 1 – Plan View

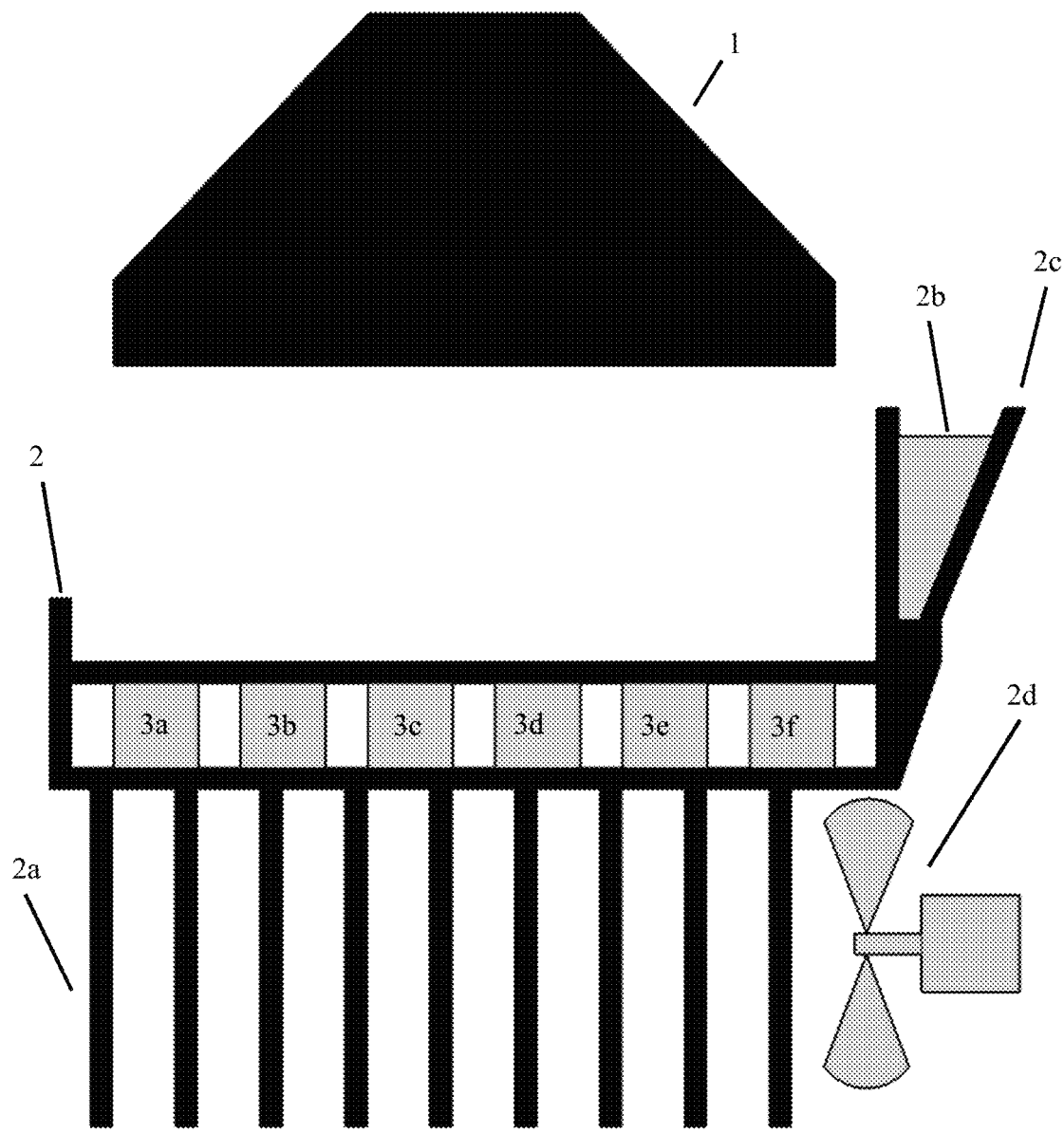
Figure 2a- Cross-Sectional View

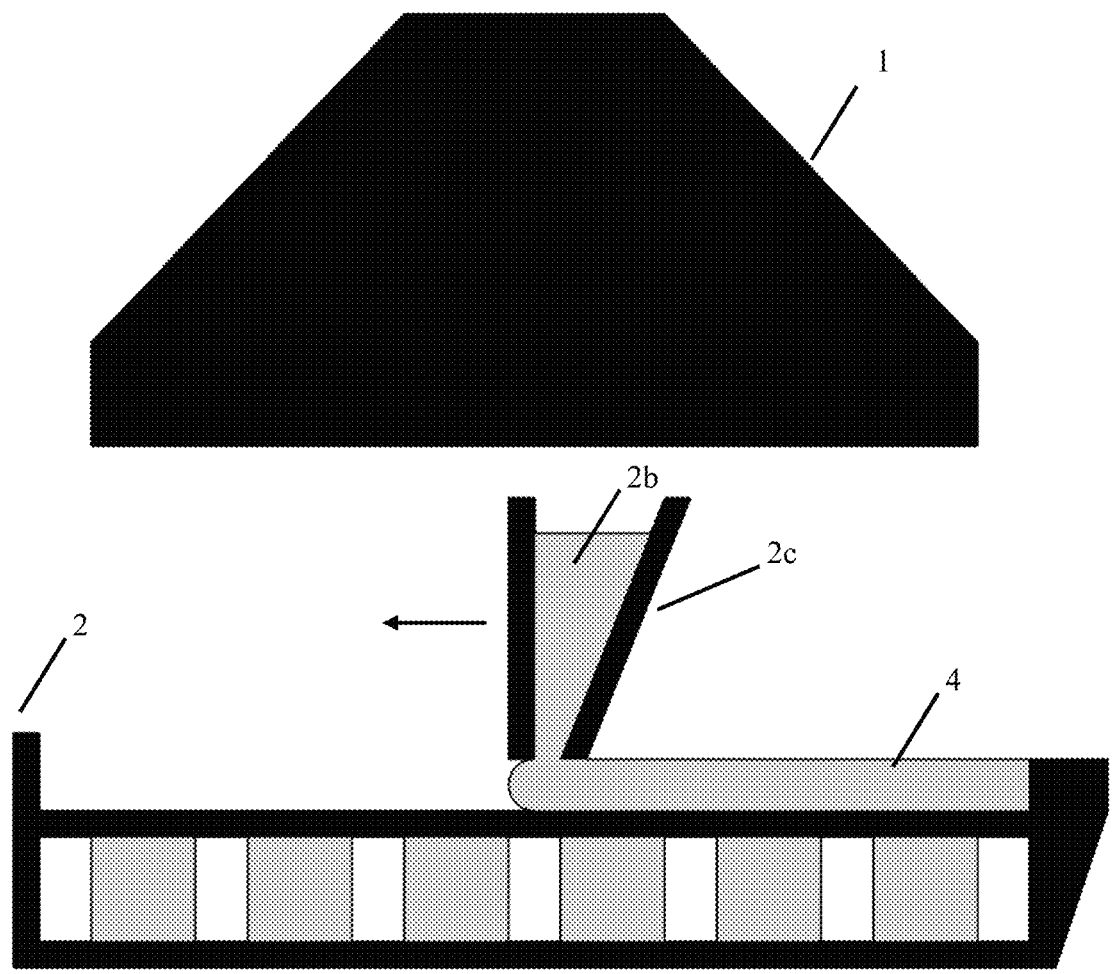
Figure 2b- Re-coater Function

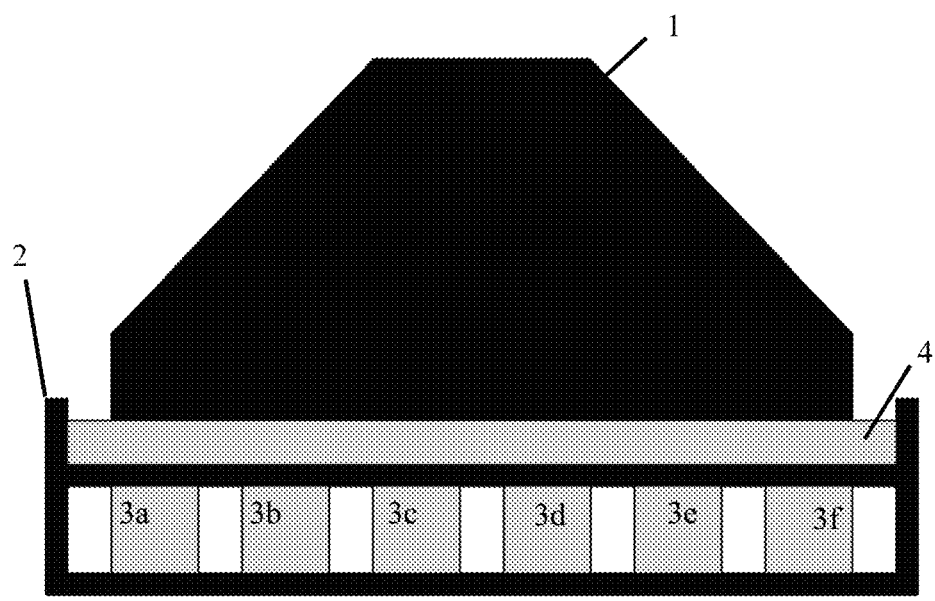
Figure 3-Cross-Sectional View, Step 1

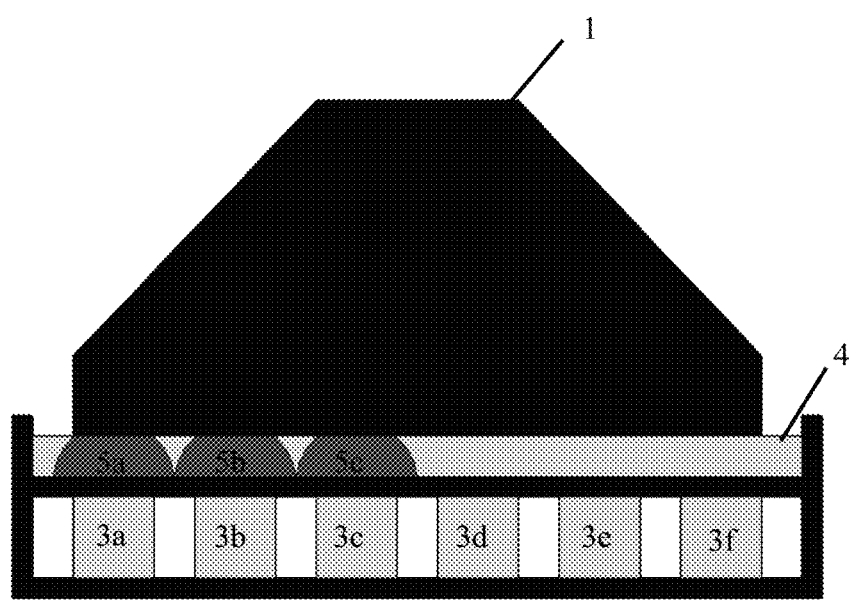
Figure 4-Cross-Sectional View, Step 2

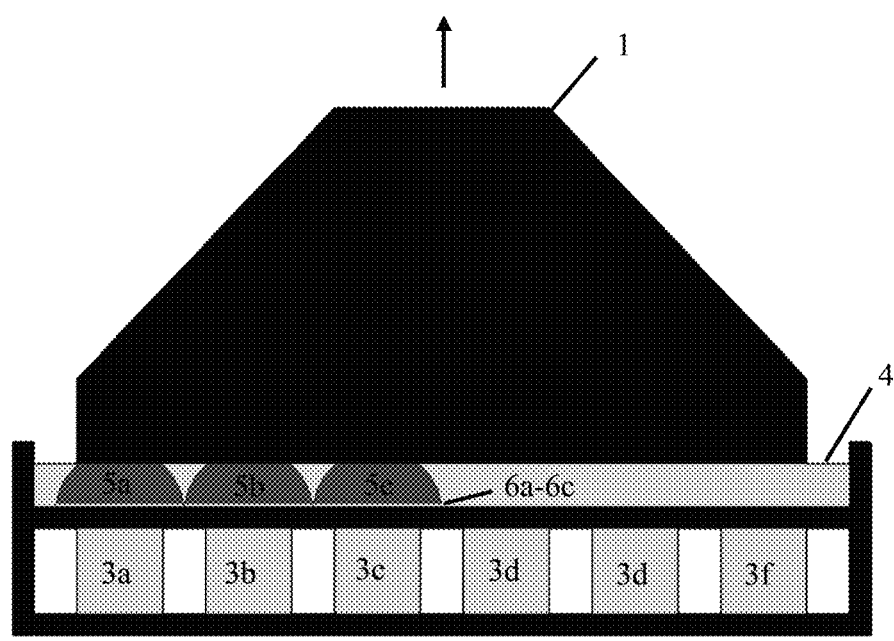
Figure 5a-Cross-Sectional View, Step 3

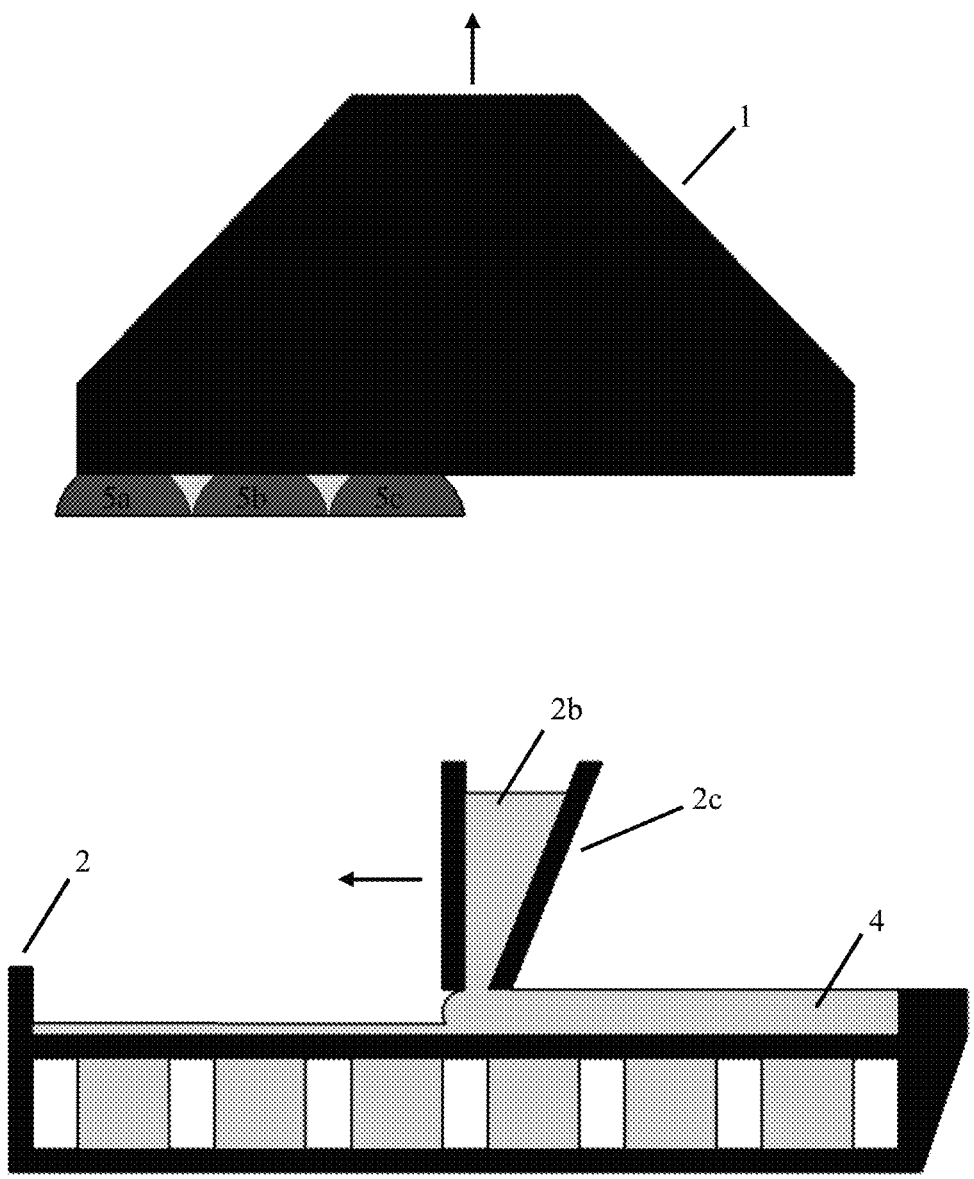
Figure 5b – Re-coater Function

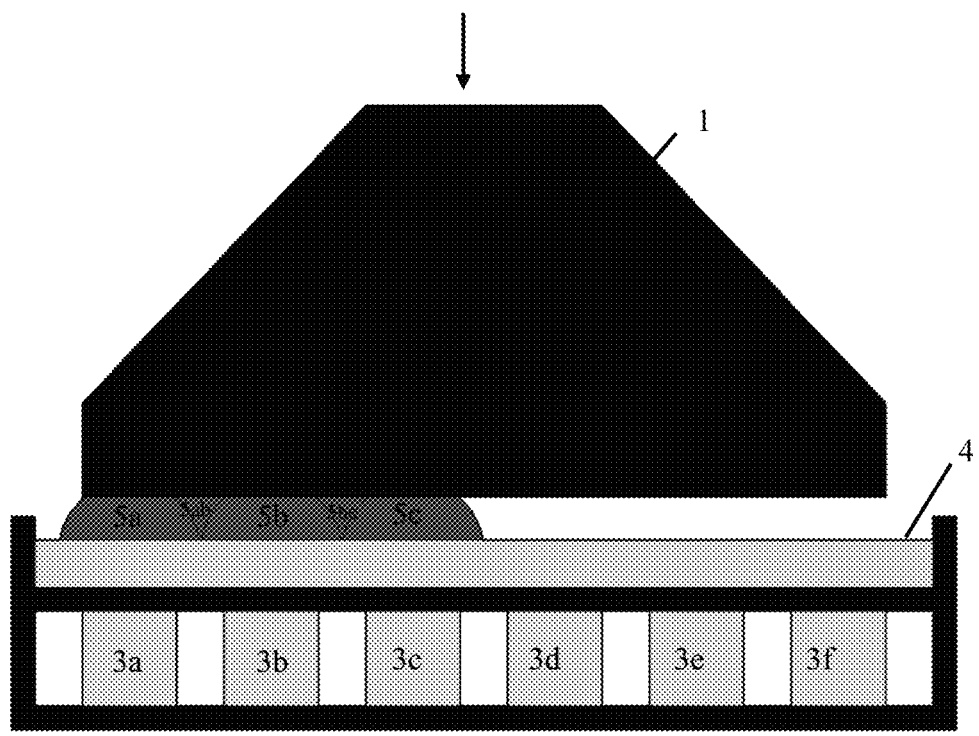
Figure 6-Cross-Sectional View, Step 4

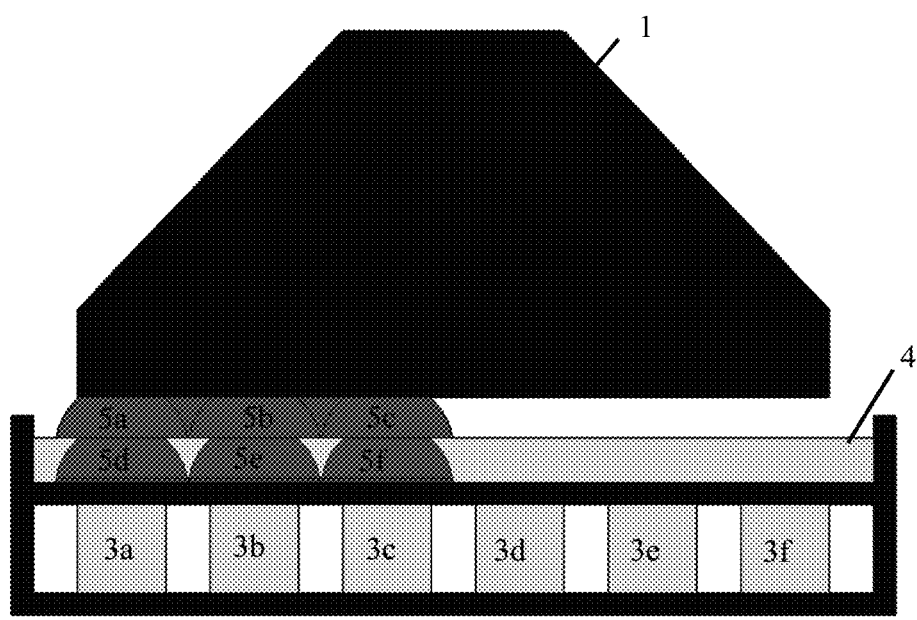
Figure 7-Cross-Sectional View, Step 5

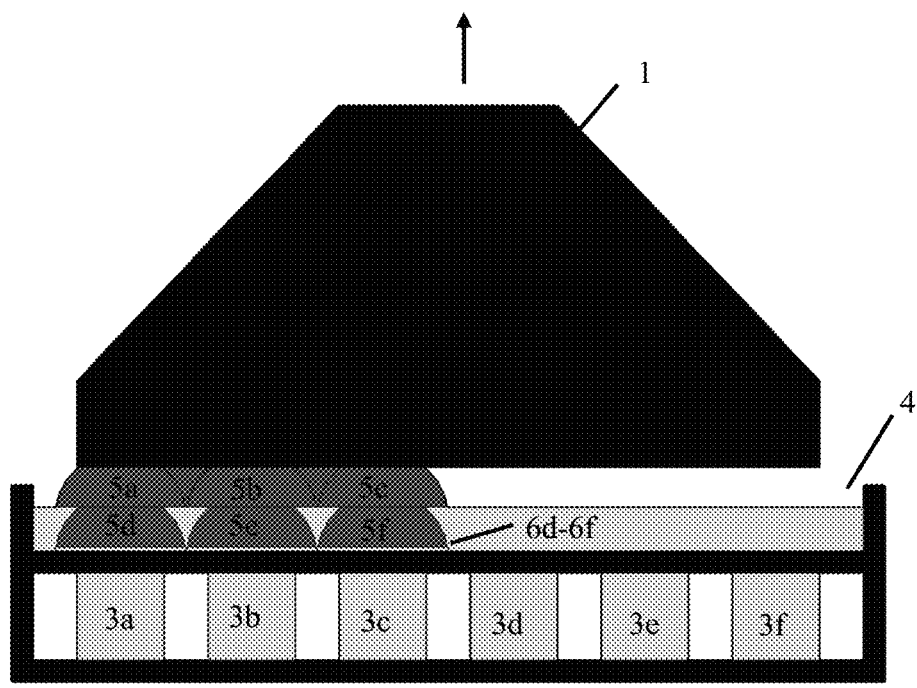
Figure 8-Cross-Sectional View, Step 6

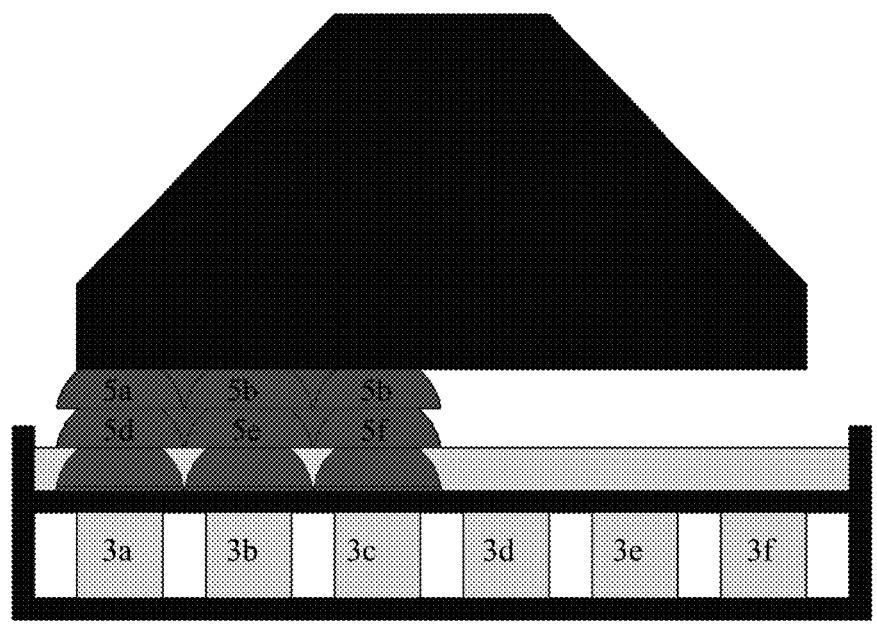
Figure 9-Cross-Sectional View, Step 7

ADDITIVE MANUFACTURING BY SELECTIVE LIQUID COOLING

FIELD OF THE INVENTION

This invention relates to methods of additive manufacturing.

BACKGROUND OF THE INVENTION

It is well known that it is difficult to additively manufacture at high speed and high resolution with engineered thermoplastics. FDM (fused deposition modeling) additive manufacturing has made its way to production manufacturing using engineered polymers, but it suffers from low speeds for high resolution parts. FDM machines that can print much faster using larger extrusion nozzles have improved the speed dilemma, but suffer from parts of low resolution. DLP (digital light processing) additive manufacturing using light cured polymers has shown much promise for increasing the speed of manufacture with high resolution, but it suffers from polymer costs too high for production manufacturing and polymers that may degrade in the presence of light. All existing additive manufacturing technology adds energy to the liquid to polymerize it, using lasers, radiation, light, etc.

SUMMARY OF THE INVENTION

This invention seeks to solve the challenges presented by the prior art by using selective cooling of a layer of liquefied thermoplastic to make high resolution parts at high speed. The present invention differs from the prior art in that it removes energy from the liquid polymer to solidify it.

According to an embodiment of the invention, consecutive layers of heated liquefied thermoplastic are placed in a build tray which has or is in contact with a matrix of heat exchange elements, each of which may be selectively and independently heated and cooled. These elements use the Peltier thermoelectric effect to operate between cold and hot modes quickly. Peltier-type hot/cold junctions are one example of devices that may be used as these elements. These junctions are currently available to industry in cells as small as 3 mm$^2$. Peltier P and N junction "pellets," the smallest operational unit size, can currently be produced down to fractions of a millimeter, and it is expected that thin film designs will soon make it possible to create a hot/cold zone measured in micrometers. This will allow the present invention to surpass resolution of even the best DLP printer today.

In a first step according to a method of the invention, a layer of thermoplastic is placed in the build tray and all of the elements in the matrix are caused to heat the build tray so as to liquefy the layer of thermoplastic above and in contact with them. A cooled platen is then lowered onto the liquefied thermoplastic creating a liquid interface between both the heat/cool element matrix and platen. The heat/cool element matrix is then controlled to cool only the elements where the part is to be formed. This cools the thermoplastic in selective areas until it solidifies to form a first layer of the part to be made, which fuses to the cooled platen. The heat/cool element matrix is then heated to liquefy a very thin layer of cooled thermoplastic at the bottom of the newly solidified first layer so the cooled and solidified first layer releases from the build tray as the platen is raised and the tray is refilled with liquid thermoplastic. What is left on the platen is the first layer of the part being formed. The platen is then lowered onto the liquefied layer of thermoplastic, only slightly higher. A new layer can then be formed on the underside of the previous cooled layer. The process continues layer-by-layer until a complete part is formed.

The present invention can be used to make objects from nearly any material that passes through a liquid to solid phase, including water-ice.

DESCRIPTION OF THE DRAWINGS

The subsequent description of the preferred embodiments of the present invention refers to the attached drawings, wherein:

FIG. 1 shows a plan view of an apparatus according to an embodiment of the invention.

FIG. 2a shows a cross-sectional view of the apparatus shown in FIG. 1.

FIG. 2b is a representation of a coating process according to an embodiment of the invention in which the build tray is filled with a volume of liquid thermoplastic.

FIG. 3 shows a cross-sectional view of the apparatus shown in FIGS. 1 and 2, with a build tray filled with a film of liquefied thermoplastic.

FIG. 4 shows a cross-sectional view of the apparatus of FIGS. 1-3, with portions of the thermoplastic cooled and solidified forming a first layer of the part.

FIG. 5a shows a cross-sectional view of the apparatus of FIGS. 1-4 with a thin layer of liquefied thermoplastic at the bottom of the tray, allowing for the releasing of the first solidified layer of the part from the build tray as the platen is lifted upwards.

FIG. 5b is a representation of a re-coating process according to an embodiment of the invention in which the build tray is refilled with a volume of thermoplastic.

FIG. 6 shows a cross-sectional view of the apparatus of FIGS. 1-5, with the platen raised an additional amount, still holding the first layer of the part, and the build tray re-filled with another volume of liquid thermoplastic for formation of a subsequent layer of the part.

FIG. 7 shows a cross-sectional view of the apparatus of FIGS. 1-6 with portions of the second volume of liquid thermoplastic in the build tray being cooled and solidified to create a second layer of the part.

FIG. 8 shows a cross-sectional view of the apparatus of FIGS. 1-7, with a thin layer of liquefied thermoplastic at the bottom of the tray, allowing for the releasing of the second solidified layer of the part from the build tray as the platen is lifted upwards, the top of the second layer adhered to the bottom of the first layer.

FIG. 9 shows a cross-sectional view of the apparatus of FIGS. 1-8, with the build tray filled with a third volume of liquefied thermoplastic being selectively cooled to create a third layer of the part.

DETAILED DESCRIPTION OF THE INVENTION

FIGS. 1 and 2a show plan and cross sectional area views of an apparatus according to an embodiment of the invention, in which platen 1 is arranged over a build tray 2 having a base that contains or is in contact with an array of Peltier-type hot/cold junctions 3a-3n. Build tray 2 also contains a heat sink 2a that transfers heat to and from Peltier junctions 3a-3n via fan 2d. Heated re-coater body 2c holds a supply of liquefied thermoplastic 2b. Platen 1 and may be raised and lowered over the build tray according to various steps in the invention.

FIG. 2b shows the re-coating process as re-coater body 2c translates across the build tray 2 to deposit liquefied thermoplastic 2b in the form of a thin film 4 onto the build tray 2. Heat sink and fan are not shown for simplification.

Referring to FIG. 3, a first step in a method according to the invention, after the build tray filled with a film of liquefied thermoplastic in FIG. 2b. Re-coater is not shown for simplification. Platen 1 is adjusted so that its bottom surface is in contact with a top surface of the thermoplastic film 4. Thermoplastic film 4 is heated uniformly by Peltier-type hot/cold junctions 3a-3f. Platen 1 is cooled at or below the solidification temperature of the thermoplastic.

In a next step, represented in FIG. 4, portions of thermoplastic film 4 continue to be heated to its liquid state by Peltier-type hot/cold junctions 3d-3f while other portions of thermoplastic film 4 are selectively cooled below its solid state by Peltier-type hot cold junctions 3a-3c. Solid zones 5a-5c created thereby become the first layer of the part to be additively manufactured. Platen 1 continues to be cooled at or below the solidification temperature of the thermoplastic.

Once the first layer of the part to be manufactured has solidified, the entire heating/cooling element matrix is energized to heat the thermoplastic material to create a thin liquid zone between the solidified first layer and the bottom of the build tray to allow the first layer to be separated from the build tray as the cooled platen 1 is lifted upwards. More specifically, thermoplastic film 4 is continues to be heated to its liquid state by Peltier-type hot/cold junctions 3d-3f. Thermoplastic film 4 is selectively heated above its liquid state by Peltier-type hot cold junctions 3a-3c to create thin liquid zones 6a-6c. At this point platen 1 begins to lift solid zones 5a-5c out of the liquid in the tray 4. Platen 1 continues to be cooled at or below the solidification temperature of the thermoplastic.

FIG. 5b shows a re-coating step as in FIG. 2b that occurs between every layer to refill the build tray as thermoplastic material is consumed by the object being printed. Platen 1 is raised to clear the Re-coater body 2b. Re-coater body 2b translates across build tray 2 to deposit liquefied thermoplastic 2c in the form of a thin film 4 onto the build tray 2 to replace liquid depleted by removing solidified zones 5a-5c.

In a subsequent step, represented by FIG. 6, platen 1 lowers solid zones 5a-5c to the surface of the liquid in the tray 4, and intermediate zones 5ab and 5bc solidify between solid zones 5a-5c to complete the first layer of the part as platen 1 continues to be cooled at or below the solidification temperature of the thermoplastic. Thermoplastic film 4 continues to be heated to its liquid state by Peltier-type hot/cold junctions 3a-3f.

The process is then repeated, as represented by FIG. 7. Various heating/cooling elements in the matrix are energized to cool the thermoplastic liquid, and others are energized to heat the thermoplastic liquid, according to the build pattern of the part being manufactured to create a second layer of the part in the same way that the first layer was created (FIG. 4).

Once the second/subsequent layer of the part is formed/solidified, all of the heating/cooling elements of the matrix are caused to heat the thermoplastic material in the build tray to create a thin layer between the bottom of the second/subsequent layer and the build tray so that the platen can be lifted together with the solidified portions of the part to make room for yet another layer in the same way that the first layer was separated from the build tray (FIG. 5). Whereas elements 3a, 3b and 3c were cooling in FIG. 7, they are switched to heating sufficient to create thin liquid zones 6d, 6e and 6f (FIG. 8) so that the platen can lift the part away from the build tray to make room for refilling of the tray and creation of yet another layer (see FIG. 9). Re-coating occurs to replace thermoplastic liquid 4 that was depleted by removing solidified zones 6a-6c.

The process continues until the part has as many layers as required and may take place in any orientation, with or without the force of gravity.

The invention claimed is:

1. An additive manufacturing device comprising:
   a build tray with an array of heat exchange elements each of which are configured to independently and alternately heat and cool a respective area of the build tray;
   a moveable platen that lowers and raises into the build tray;
   a heated re-coater body moveably mounted between said build tray and said moveable platen and configured to apply successive layers of thermoplastic material to said build tray;
   said successive layers of thermoplastic material alternately solidified by the heat exchange elements of the build tray by cooling said thermoplastic material to create each layer of a multilayer part and then partially liquefied to release solidified thermoplastic material from the build tray as the moveable platen moves out of the build tray.

2. The additive manufacturing device of claim 1 configured to operate in any orientation, with or without the force of gravity.

3. The additive manufacturing device of claim 2 comprising a second liquefied thermosetting compound.

4. The additive manufacturing device of claim 1 wherein the heat exchange elements are Peltier hot/cold junctions.

5. The additive manufacturing device of claim 1 wherein the moveable platen is configured to be heated or cooled.

6. The additive manufacturing device of claim 1 further comprising a temperature controlled enclosure surrounding the build tray and moveable platen.

* * * * *